(12) United States Patent
Phillips et al.

(10) Patent No.: US 8,388,485 B2
(45) Date of Patent: Mar. 5, 2013

(54) NINE SPEED AUTOMATIC TRANSMISSION

(75) Inventors: Andrew W. Phillips, Rochester, MI (US); James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/372,004

(22) Filed: Feb. 13, 2012

(65) Prior Publication Data

US 2012/0142480 A1 Jun. 7, 2012

Related U.S. Application Data

(63) Continuation of application No. 12/105,819, filed on Apr. 18, 2008, now Pat. No. 8,113,978.

(51) Int. Cl.
*F16H 37/02* (2006.01)
*F16H 3/44* (2006.01)

(52) U.S. Cl. ........ 475/211; 475/212; 475/213; 475/218; 475/219; 475/302

(58) Field of Classification Search .......... 475/210–213, 475/218, 219, 302
See application file for complete search history.

(56) References Cited

U.S. PATENT DOCUMENTS

| | | | |
|---|---|---|---|
| 5,743,824 | A | 4/1998 | Park |
| 5,755,637 | A | 5/1998 | Park |
| 6,176,803 | B1 | 1/2001 | Meyer et al. |
| 6,984,187 | B2 | 1/2006 | Biermann |
| 7,198,586 | B2 | 4/2007 | Brooks et al. |
| 7,311,630 | B2 | 12/2007 | Borgerson |
| 7,354,375 | B2 | 4/2008 | Brooks et al. |
| 8,113,977 | B2 * | 2/2012 | Phillips .................... 475/210 |
| 8,113,978 | B2 * | 2/2012 | Phillips et al. ............ 475/210 |
| 2009/0036252 | A1 | 2/2009 | Phillips et al. |
| 2010/0210388 | A1 | 8/2010 | Grochowski et al. |

\* cited by examiner

*Primary Examiner* — Tisha Lewis

(57) ABSTRACT

A multispeed automatic transmission is provided having four planetary gear sets, a plurality of friction and synchronizer clutches and two chain drive assemblies. The transmission is arranged along two parallel axes of rotation: a first axis defined by the input shaft and a second axis defined by the output shaft. The chain drive assemblies transfer power between sprockets disposed on the two axes. Various combinations of clutches may be engaged to provide nine forward speed ratios and five reverse speed ratios.

4 Claims, 3 Drawing Sheets

| OPERATING CONDITIONS | | | ACTIVE CLUTCH ELEMENTS | | | | | | | | |
|---|---|---|---|---|---|---|---|---|---|---|---|
| GEAR STATE | GEAR RATIO | RATIO STEP | 82 | 84 | 86 | 88 | 90 | 92 | 94 | 96 | 98 |
| R5 | -6.410 | 8.00 | | X | | X | | | X | | |
| R4 | -1.366 | 1.91 | X | | | X | | | | | X |
| R3 | -1.730 | 1.27 | | X | | X | | X | | | |
| R2 | -3.648 | 2.11 | X | | | X | | | | X | |
| R1 | -5.714 | 1.57 | | X | | X | X | | | | |
| N | | | | | | | | | | | |
| 1ST | 6.400 | 1.35 | X | | | | X | | | | |
| 2ND | 4.740 | 1.46 | | | X | | X | | | X | |
| 3RD | 3.257 | 1.24 | | | X | | | | | X | |
| 4TH | 2.635 | 1.36 | | | X | | | X | | X | |
| 5TH | 1.938 | 1.24 | X | | | | | X | | | |
| 6TH | 1.559 | 1.28 | | | X | | | X | | | X |
| 7TH | 1.220 | 1.19 | | | X | | | | | | X |
| 8TH | 1.022 | 1.28 | | | X | | | | X | | X |
| 9TH | 0.800 | 8.00 | X | | | | | | X | | |

X - ENGAGED, CARRYING TORQUE

NINE SPEED AUTOMATIC TRANSMISSION

CROSS-REFERENCE TO RELATED APPLICATIONS

This application is a continuation of U.S. Pat. Ser. No. 12/105,819, now U.S. Pat. No. 8,113,978 filed on Apr. 18, 2008 and as such, claims priority thereto under 35 U.S.C. §120.

FIELD

The present disclosure relates to an automatic transmission for a motor vehicle and more particularly to a nine speed automatic transmission for a motor vehicle having four planetary gear sets and a plurality of friction and synchronizer clutches.

BACKGROUND

The statements in this section merely provide background information related to the present disclosure and may or may not constitute prior art.

Many current passenger car multiple speed automatic transmissions include a combination of planetary gear sets and selectively engaged clutches and brakes which provide a plurality of forward torque or gear ratios.

Whereas three and four speed automatic transmissions were once commonplace and considered suitable to provide the requisite flexibility and performance, increasingly demanding economic and performance goals as well as consumer preference continue to encourage automatic transmission research and development. One result of this effort has been an increase in the number of available forward gears or speed ratios provided by the transmission. Six, seven and eight speed automatic transmissions are increasingly available.

Because they so closely match the power and torque curves of an engine to the vehicle speed and load, such six, seven and eight speed transmissions provide significant performance enhancements and fuel economies.

Study of these transmissions configurations, however, reveals that improvements are possible. For example, each of the selectively engaged frictional couplings, i.e., the clutches and the brakes, contribute to frictional losses, referred to as spin losses, when they are not engaged. Such spin losses are the result of relative rotation between the multiple, interleaved plates or discs of such devices. Two primary factors influence spin losses: the size or torque capacity of the clutch or brake and the speed difference across the clutch or brake. Reducing such spin losses therefore provides improved transmission efficiency which is highly desirable.

SUMMARY

The present invention provides a nine forward speed automatic transmission for a motor vehicle which includes four planetary gear sets, a plurality of friction and synchronizing clutches and two chain drive assemblies. The transmission is arranged along two parallel axes of rotation: a first axis defined by the input shaft and a second axis defined by the output shaft. The chain drive assemblies transfer power between sprockets disposed on the two axes.

Input torque is selectively provided to either a sun gear, a planet carrier or a ring gear of a first, double pinion planetary gear set by engagement of one of three input clutches. The sun gear and the planet gear carrier are coupled to a respective pair of chain sprockets disposed on the input axis. A pair of chains transfer torque to a respective pair of chain sprockets disposed on the output axis. The chain driven by the sun gear of the first, double pinion planetary gear set directly drives a sun gear of a second, simple planetary gear set that, with a third, simple planetary gear set, acts as a first sub-transmission. The chain driven by the planet gear carrier of the first, compound planetary gear set directly drives a sun gear of a fourth, simple planetary gear set that acts as a second sub-transmission. The transmission output is commonly connected to and driven by a ring gear of the third, simple planetary gear set and a planet gear carrier of the fourth, simple planetary gear set. Engagement of various combinations of the input clutches and a plurality of synchronizer clutches provides nine forward speeds and five reverse speeds.

It is thus an object of the present invention to provide an automatic transmission for motor vehicles which provides nine forward speeds.

It is a further object of the present invention to provide an automatic transmission for motor vehicles having an input shaft on a first axis and an output shaft and a second, offset, parallel axis.

It is a still further object of the present invention to provide an automatic transmission for motor vehicles having four planetary gear sets and a plurality of friction and synchronizer clutches.

It is a still further object of the present invention to provide an automatic transmission for motor vehicles having a pair of chain drives connecting components disposed on a pair of parallel, spaced apart axes.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. Like reference numbers in the various Figures consistently refer to the same element, component or feature.

DETAILED DESCRIPTION

The following description is merely exemplary in nature and is not intended to limit the present disclosure, application or uses.

Figure 1:
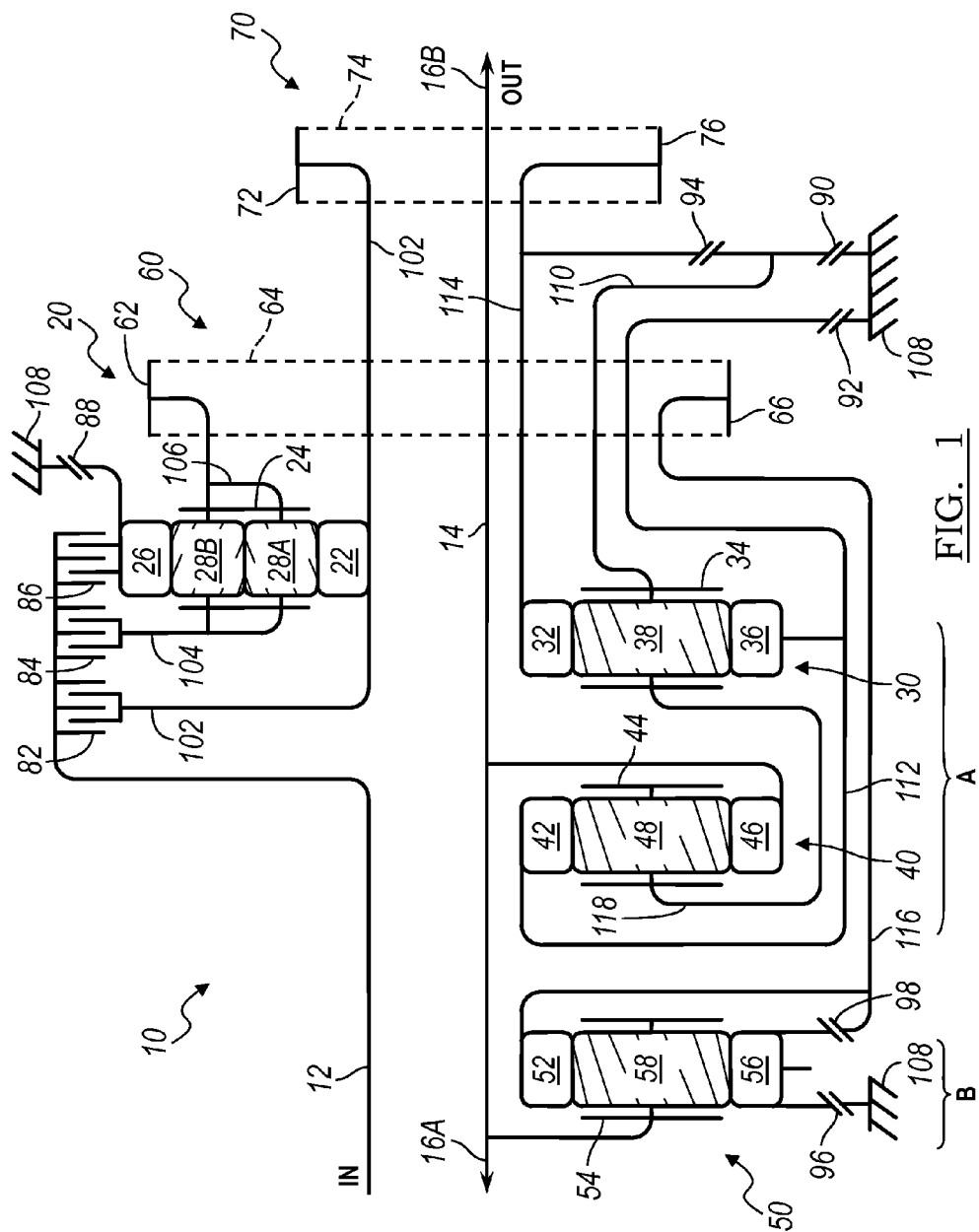
FIG. 1 is a diagrammatic view of a first embodiment of a nine speed automatic transmission according to the present invention.

With reference to FIG. 1, a first embodiment of a nine speed automatic transmission according to the present invention is illustrated and designated by the reference number 10. The automatic transmission 10 includes an input member or shaft 12 which is coupled to and driven by, for example, the output of an engine (not illustrated) or the turbine of a torque converter (not illustrated). The transmission 10 also includes an output shaft 14 having first and second ends 16A and 16B. If the transmission 10 is longitudinally mounted in a vehicle, one of the ends 16A or 16B may be utilized to drive a final drive unit in the front or rear of a vehicle or both may be utilized to drive final drive units in the front and rear of a vehicle. Alternatively, if the transmission 10 is mounted transversely in a vehicle, either or both of the ends 16A and 16B may be utilized to provide drive torque to either or both sides of the vehicle.

The automatic transmission 10 also includes a first, double pinion planetary gear set or assembly 20 disposed about the axis of the input shaft 12, a second, simple planetary gear set or assembly 30 disposed about the axis of the output shaft 14, a third, simple planetary gear set or assembly 40 disposed about the axis of the output shaft 14 and a fourth, simple planetary gear set or assembly 50 also disposed about the axis of the output shaft 14.

The first, double pinion planetary gear assembly 20 includes a first sun gear 22, a first planet gear carrier 24 and a first ring gear 26. Rotatably disposed in the first planet gear carrier 24 are a plurality of pairs of inner and outer intermeshing first planet gears 28A and 28B, one pair of which is illustrated in FIG. 1. Each of the inner first planet gears 28A is in constant mesh with the first sun gear 22 and its associated outer first planet gear 28B and each of the outer first planet gears 28B is in constant mesh with the first ring gear 26. The second, simple planetary gear assembly 30 includes a second sun gear 32, a second planet gear carrier 34 and a second ring gear 36. Rotatably disposed in the second planet gear carrier 34 are a plurality of second planet gears 38, one of which is illustrated in FIG. 1. Each of the plurality of second planet gears 38 is in constant mesh with the second sun gear 32 and the second ring gear 36.

The third, simple planetary gear assembly 40 includes a third sun gear 42, a third planet gear carrier 44 and a third ring gear 46. Rotatably disposed in the third planet gear carrier 44 are a plurality of third planet gears 48, one of which is illustrated in FIG. 1. Each of the plurality of third planet gears 48 is in constant mesh with the third sun gear 42 and the third ring gear 46. The fourth, simple planetary gear assembly 50 includes a fourth sun gear 52, a fourth planet gear carrier 54 and a fourth ring gear 56. Rotatably disposed in the fourth planet gear carrier 54 are a plurality of fourth planet gears 58, one of which is illustrated in FIG. 1. Each of the plurality of fourth planet gears 58 is in constant mesh with the fourth sun gear 52 and the fourth ring gear 56. It should be noted that depending upon the desired gear ratios to be provided by the fourth, simple planetary gear assembly 50, the plurality of fourth, single planet gears 58 may be replaced by pairs of meshing planet gears (not illustrated) creating a double pinion planetary gear assembly.

The automatic transmission 10 also includes a first chain drive assembly 60 having a first drive chain sprocket 62 disposed on the axis of the input shaft 12, a first multiple link chain 64 and a first driven chain sprocket 66 disposed on the axis of the output shaft 14. Adjacent the first chain drive assembly 60 is a second chain drive assembly 70 having a second drive chain sprocket 72 disposed on the axis of the input shaft 12, a second multiple link chain 74 and a second driven chain sprocket 76 disposed on the axis of the output shaft 14.

The automatic transmission 10 further includes a plurality of torque transmitting devices such as friction clutches and synchronizer clutches. As utilized herein, the term "friction clutch" refers to a torque transmitting device having first and second pluralities of interleaved friction plates or discs which are compressed by an associated operator or actuator and which is capable of carrying high levels of torque, i.e., the actual torque carried by the automatic transmission 10. On the other hand, a "synchronizer clutch," as utilized herein, refers to a torque transmitting device having a limited torque capacity synchronizer which is capable of carrying sufficient torque to overcome the inertia of an associated gear in order to synchronize it with a shaft and a positive clutch such as a dog clutch which engages to positively couple the gear and shaft and which is capable of carrying high levels of torque. Furthermore, it should be understood that while these devices are referred to as synchronizer clutches which suggests that they synchronize and connect two rotating members, several of the synchronizer clutches are, in fact, utilized as brakes, i.e., they slow and connect a rotatable member to a fixed or stationary member, thereby inhibiting rotation of the rotatable member. In the following description, those synchronizer clutches functioning as brakes will be noted by the parenthetical addition of the word "brake."

A first high torque capacity friction clutch 82 having, as noted, interleaved pluralities of friction clutch plates or discs is operably disposed between and selectively connects the input shaft 12 and a first shaft, quill or concentric member 102 which is coupled to and drives the first sun gear 22 of the first, double pinion planetary gear assembly 20 and the second drive chain sprocket 72 of the second chain drive assembly 70. A second high torque capacity friction clutch 84 is operably disposed between and selectively connects the input shaft 12 and a second shaft, quill or concentric member 104 which is coupled to and drives the first planet gear carrier 24 of the first, double pinion planetary gear assembly 20. The first planet gear carrier 24 of the first, double pinion planetary gear assembly 20 is, in turn coupled to a third shaft, quill or concentric member 106 which is coupled to and drives the first drive chain sprocket 62 of the first chain drive assembly 60. A third high torque capacity friction clutch 86 is operably disposed between and selectively connects the input shaft 12 to the first ring gear 26 of the first, double pinion planetary gear assembly 20.

A first synchronizer clutch (brake) 88 having, as noted above, a synchronizer and positive clutch is operably disposed between and selectively connects or grounds the first ring gear 26 of the first, double pinion planetary gear assembly 20 to a stationary housing 108 of the automatic transmission 10. A second synchronizer clutch (brake) 90 is operably disposed between and selectively connects or grounds to the stationary housing 108 a fourth shaft, quill or concentric member 110 which is coupled to the second planet gear carrier 34 of the second, simple planetary gear assembly 30. A third synchronizer clutch (brake) 92 is operably disposed between and selectively connects or grounds a fifth shaft, quill or concentric member 112 which is coupled to both the second ring gear 36 of the second, simple planetary gear assembly 30 and the third sun gear 42 of the third, simple planetary gear assembly 40.

A fourth synchronizer clutch 94 is operably disposed between and selectively connects a sixth shaft, quill or concentric member 114 to the fourth shaft, quill or concentric member 110. The sixth shaft, quill or concentric member 114 couples the second sun gear 32 of the second, simple planetary gear set 30 and the second driven chain sprocket 72 of the second chain drive assembly 70. A fifth synchronizer clutch (brake) 96 is operably disposed between and selectively connects or grounds the fourth ring gear 56 of the fourth, simple planetary gear assembly 50 to the stationary housing 108. A sixth synchronizer clutch 98 is operably disposed between and selectively connects the fourth ring gear 56 of the fourth, simple planetary gear assembly 50 to a seventh shaft, quill or intermediate member 116. The seventh shaft, quill or intermediate member 116 interconnects the fourth sun gear 52 of the fourth, simple planetary gear assembly 50 and the first driven chain sprocket 66 of the first chain drive assembly 60.

An eighth shaft, quill or concentric member 118 couples the second planet gear carrier 34 of the second, simple planetary gear assembly 30 to the third planet gear carrier 44 of the third, simple planetary gear assembly 40. Alternatively, the eighth shaft, quill or concentric member may be an extension of the fourth shaft, quill or concentric member 110. Similarly, extensions or portions of the output shaft 14 are coupled to the third ring gear 46 of the third, simple planetary gear assembly 40 and the fourth planet gear carrier 54 of the fourth, simple planetary gear assembly 50.

Inspection of the nine speed automatic transmission 10 just described and illustrated in FIG. 1 reveals that the second and third planetary gear assemblies 30 and 40 and the second, third and fourth synchronizer clutches 90, 92 and 94 constitute a first sub-transmission A having an input which is coupled to and driven by the second driven chain sprocket 76 and an output which is coupled to and drives the output shaft 14. The first sub-transmission A provides three speeds or gear ratios. Similarly, the fourth planetary gear assembly 50 and the fifth and sixth synchronizer clutches 96 and 98 constitute a second sub-transmission B having an input which is coupled to and driven by the first driven chain sprocket 66 and an output which is coupled to and drives the output shaft 14. The second sub-transmission B provides two speeds or gear ratios.

Figure 2:
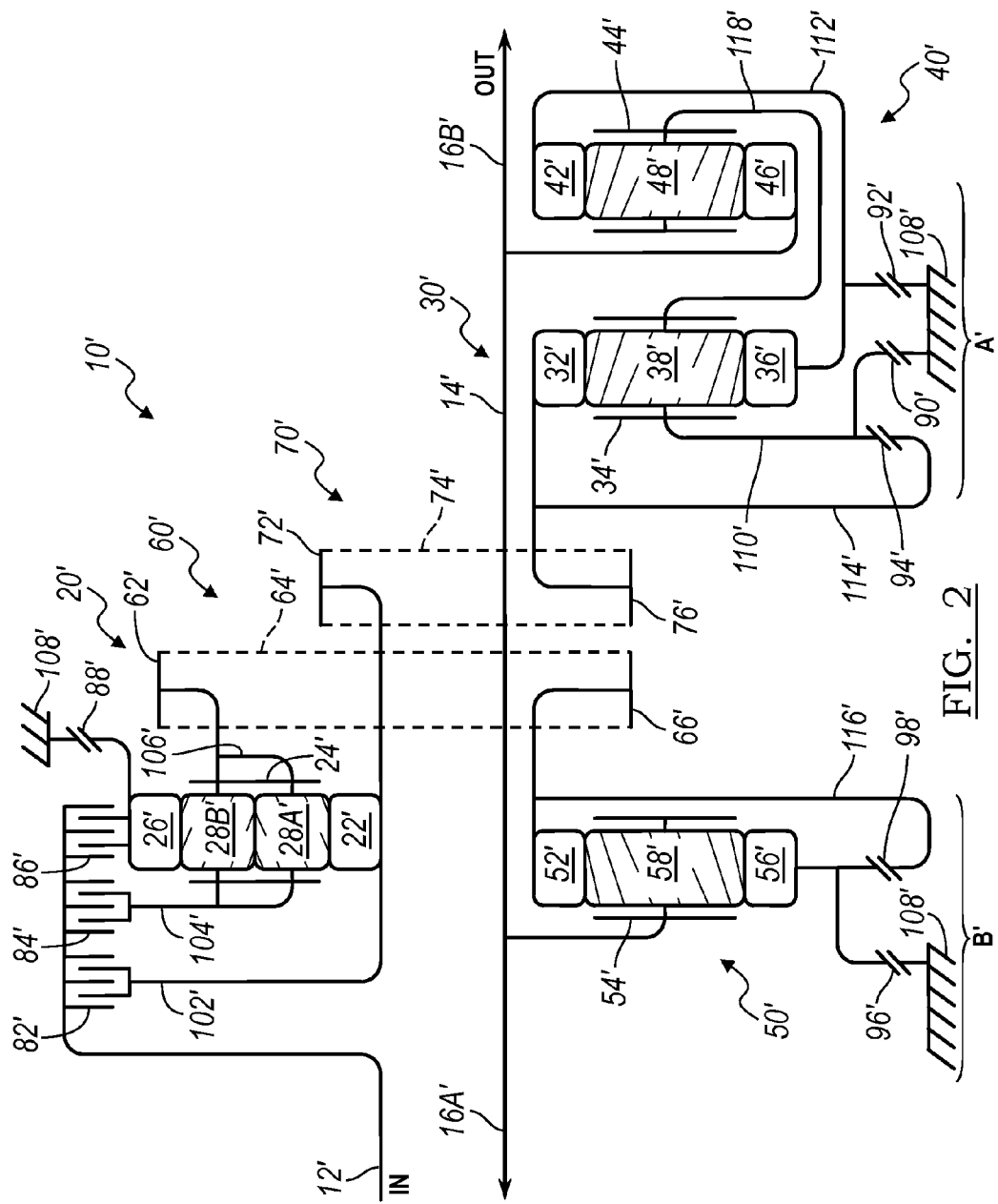
FIG. 2 is a diagrammatic view of a second embodiment of a nine speed automatic transmission according to the present invention.

Referring now to FIG. 2, a second embodiment of the nine speed automatic transmission 10 according to the present invention is illustrated and designated by the reference number 10'. Upon examination, it will be appreciated that the second embodiment of the automatic transmission 10' includes all of the same active components, i.e., planetary gear assemblies and friction and synchronizer clutches and that the differences between the two embodiments relate to the arrangement of the active components and shafts or concentric members associated with the second, third and fourth planetary gear sets or assemblies 30, 40 and 50. In this regard, it should be noted that the arrangement of the active components and shafts associated with the first, double pinion planetary gear assembly 20 is the same in both embodiments.

Thus, the second embodiment nine speed automatic transmission 10' includes an input shaft 12' and an output shaft 14' having first and second ends 16A' and 16B'.

A first, double pinion planetary gear assembly 20' includes a first sun gear 22', a first planet gear carrier 24', a first ring gear 26' and a plurality of pairs of intermeshing first planet gears 28A' and 28B'. A second, simple planetary gear assembly 30' includes a second sun gear 32', a second planet gear carrier 34', a second ring gear 36' and a plurality of second planet gears 38'. A third, simple planetary gear assembly 40' includes a third sun gear 42', a third planet gear carrier 44', a third ring gear 46' and a plurality of third planet gears 48'. A fourth, simple planetary gear assembly 50' includes a fourth sun gear 52', a fourth planet gear carrier 54', a fourth ring gear 56' and a plurality of fourth planet gears 58'. Again, depending upon the desired gear ratios to be provided by the fourth, simple planetary gear assembly 50', the plurality of fourth, single planet gears 58' may be replaced by pairs of meshing planet gears (not illustrated) creating a double pinion planetary gear assembly.

Arranged on the side of the first, double pinion planetary gear assembly 20' opposite the input shaft 12' and between the second, simple planetary gear assembly 30' and the fourth, simple planetary gear assembly 50' are a first chain drive assembly 60' and a second chain drive assembly 70'. The first chain drive assembly 60' includes a first chain drive sprocket 62', a first multiple link drive chain 64' and a first driven chain sprocket 66'. The second chain drive assembly 70' includes a second chain drive sprocket 72', a second multiple link drive chain 74' and a second driven chain sprocket 76'.

The second embodiment nine speed automatic transmission 10' also includes a first friction clutch 82', a second friction clutch 84' and a third friction clutch 86' all of which are coupled to and driven by the input shaft 12'. A first shaft or concentric member 102' couples the output of the first friction clutch 82' to the first sun gear 22' of the first, double pinion planetary gear assembly 20' and to the second chain drive sprocket 72'. A second shaft or concentric member 104' couples the output of the second friction clutch 84' to the first planet gear carrier 24' of the first, double pinion planetary gear assembly 20'. A third shaft or concentric member 106' couples the first planet gear carrier 24' of the first, double pinion planetary gear assembly 20' to the first chain drive sprocket 62'. The output of the third friction clutch 86' is coupled to the first ring gear 26' of the first, double pinion planetary gear assembly 20'.

A first synchronizer clutch (brake) 88' selectively connects or grounds the first ring gear 26' of the first, double pinion planetary gear assembly 20' to a stationary housing 108' of the automatic transmission 10'. A second synchronizer clutch (brake) 90' is coupled to a fourth shaft or concentric member 110' and selectively grounds the second planet gear carrier 34' of the second, simple planetary gear assembly 30 to the stationary housing 108'. A third synchronizer clutch (brake) 92' selectively grounds a fifth shaft or concentric member 112' which is coupled to both the second ring gear 36' of the second, simple planetary gear assembly 30' and the third sun gear 42' of the third, simple planetary gear assembly 40'. A fourth synchronizer clutch 94' selectively connects the fourth shaft or concentric member 110' to a sixth shaft or concentric member 114' which is coupled to the second sun gear 32' of the second, simple planetary gear assembly 30' and the second driven chain sprocket 76'. A fifth synchronizer clutch (brake) 96' selectively grounds the fourth ring gear 56' of the fourth, simple planetary gear assembly 50' to the stationary housing 108'. A sixth synchronizer clutch 98' selectively connects the fourth ring gear 56' of the fourth, simple planetary gear assembly 50' to a seventh shaft or concentric member 116' which is coupled to the fourth sun gear 52' of the fourth, simple planetary gear assembly 50' and the first driven chain sprocket 66'.

The second embodiment of the nine speed automatic transmission 10' illustrated in FIG. 2 includes a first sub-transmission A' encompassing the second and third planetary gear assemblies 30' and 40' and the second, third and fourth synchronizer clutches 90', 92' and 94' which is coupled to and driven by the second driven chain sprocket 76' and is coupled to and drives the output shaft 14'. The first sub-transmission A' provides three speeds or gears ratios. Similarly, a second sub-transmission B' encompasses the fourth planetary gear assembly 50' and the fifth and sixth synchronizer clutches 96' and 98' which is coupled to and driven by the first driven chain sprocket 66' and is coupled to and drives the output shaft 14'. The second sub-transmission B' provides two speeds or gear ratios.

Figures 3, 4:
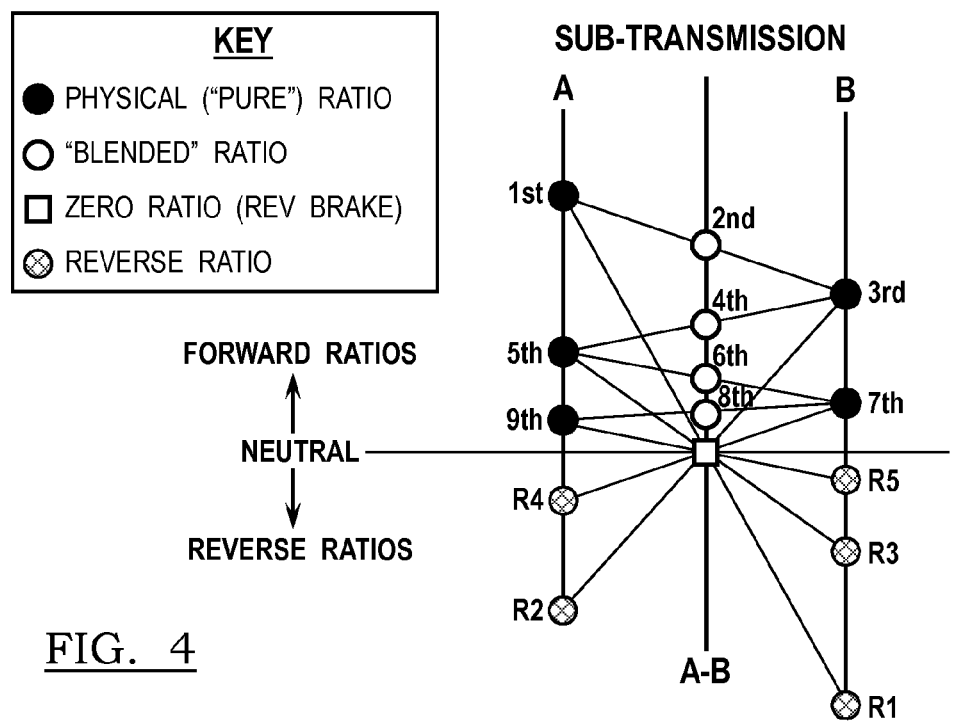
FIG. 3 is a truth table presenting the various combinations of engaged clutches which achieve a given forward or reverse gear or speed ratio.
FIG. 4 is a diagram illustrating the relationship between the physical gears and the virtual or blended gears of a nine speed automatic transmission according to the present invention.

Referring now to FIGS. 3 and 4, the operation of both embodiments 10 and 10' of the nine speed automatic transmission will be described. It will be appreciated that the transmissions 10 and 10' are capable of transmitting torque from their input shafts 12 and 12' to their output shafts 14 and 14' in nine forward speed, torque or gear ratios and five reverse speed, torque or gear ratios. Each forward or reverse gear ratio is attained by activation or engagement of various combinations of two or three of the clutches as will be explained below. FIG. 3 is a truth table which presents the various combinations of friction and synchronizer clutches that are activated or engaged to achieve the various forward and reverse gear ratios. Gear ratios and ratios steps are also provided although it should be understood that these numerical values are presented for purposes of example and illustration only and that such values may be adjusted over significant ranges to accommodate various applications and operational criteria of the automatic transmissions 10 and 10'.

In neutral, none of the clutch elements are activated or engaged.

In the lowest speed (highest gear ratio) reverse gear, denominated R1, the second friction clutch 84, the first synchronizer clutch (brake) 88 and the second synchronizer clutch (brake) 90 are activated or engaged.

Moving to the next, higher speed (lower gear ratio) reverse gear, denominated R2, the second friction clutch 84 and the second synchronizer clutch (brake) 90 are deactivated or disengaged and the first friction clutch 82 and the fifth synchronizer clutch (brake) 96 are activated or engaged while the first synchronizer clutch (brake) 88 remains activated or engaged.

As higher speed reverse gears, e.g., R3, R4, etc., are selected and engaged, this process of friction and synchronizer clutch disengagement and engagement continues according to the truth table of FIG. 3. Note that the first synchronizer clutch (brake) 88 remains activated or engaged in all five reverse gear ratios. It should be appreciated that the five reverse gear ratios are, in fact, those three pure gear ratios provided by the sub-transmission A and the two pure gear ratios provided by the sub-transmission B.

From neutral, first gear is achieved by activating or engaging the first friction clutch 82 and the second synchronizer clutch (brake) 90. First gear is an actual or pure gear ratio achieved by utilizing the lowest speed gear (highest gear ratio) provided by the sub-transmission A.

Second gear is achieved by deactivating or disengaging the first friction clutch 82 and activating or engaging the third friction clutch 86 and the fifth synchronizer clutch (brake) 96. As the truth table of FIG. 3 presents, the second synchronizer clutch (brake) 90 remains activated or engaged. As illustrated in FIG. 4, second gear is a virtual or blended gear ratio achieved by mixing or blending the lowest speed gear (highest gear ratio) provided by the sub-transmission A and the lower speed gear (higher gear ratio) provided by the sub-transmission B.

Third gear is achieved by deactivating or disengaging the third friction clutch 86 and the second synchronizer clutch (brake) 90 and maintaining activation or engagement of the fifth synchronizer clutch (brake) 96. The second friction clutch 84 is activated or engaged. Third gear is an actual or pure gear ratio achieved by utilizing the lower speed gear (higher gear ratio) provided by the sub-transmission B.

Fourth gear is achieved by deactivating or disengaging the second friction clutch 84 and activating or engaging the third friction clutch 86 and the third synchronizer clutch 92. Engagement or activation of the fifth synchronizer clutch (brake) 96 is maintained during the third gear to fourth gear shift and in fourth gear. Once again and as illustrated in FIG. 4, fourth gear is a virtual or blended gear ratio which is achieved by mixing or blending the lower speed gear (higher gear ratio) provided by the sub-transmission B with the middle speed gear (middle gear ratio) provided by the sub-transmission A.

Fifth gear is achieved by deactivating or disengaging the third friction clutch 86 and the fifth synchronizer clutch (brake) 96 and activating or engaging the first friction clutch 82 while maintaining activation or engagement of the third synchronizer clutch (brake) 92. Fifth gear is an actual or pure gear ratio achieved by utilizing the middle speed gear (middle gear ratio) provided by the sub-transmission A.

Sixth gear is achieved by deactivating or disengaging the first friction clutch 82 and activating or engaging the third friction clutch 86 and the sixth synchronizer clutch 98 while maintaining activation or engagement of the third synchronizer clutch (brake) 92. As illustrated in FIG. 4, sixth gear is also a virtual or blended gear ratio which is achieved by mixing or blending the middle speed gear (middle gear ratio) of the sub-transmission A and the higher speed gear (lower gear ratio) of the sub-transmission B.

Seventh gear is achieved by deactivating or disengaging the third friction clutch 86 and the third synchronizer clutch (brake) 92 and activating or engaging the second friction clutch 84 while maintaining activation or engagement of the sixth synchronizer clutch 98. Seventh gear is an actual or pure gear ratio achieved by utilizing the higher speed gear (lower gear ratio) of the sub-transmission B.

Eighth gear is achieved by deactivating or disengaging the second friction clutch 84 and activating or engaging the third friction clutch 86 and the fourth synchronizer clutch 94 while maintaining activation or engagement of the sixth synchronizer clutch 98. Eighth gear is also a virtual or blended gear ratio which is achieved by mixing or blending the highest speed gear (lowest gear ratio) of the sub-transmission A and the higher speed gear (lower gear ratio) of the sub-transmission B.

Ninth gear is achieved by deactivating or disengaging the third friction clutch 86 and the sixth synchronizer clutch 98 and activating or engaging the first friction clutch 82 while maintaining activation or engagement of the fourth synchronizer clutch 94. Ninth gear is an actual or pure gear ratio achieved by utilizing the highest speed gear (lowest gear ratio) of the sub-transmission A.

It will be appreciated that the foregoing explanation of operation and gear states of the first embodiment of the nine speed automatic transmission 10 is wholly and accurately applicable to operation of the second embodiment of the nine speed transmission 10'. Furthermore, the explanation assumes that all clutches not specifically referenced in a given gear ratio are inactive or disengaged. The explanation also assumes that during gear shifts between at least adjacent gear ratios, a clutch that is activated or engaged in both gear ratios will remain activated or engaged during the shift. Finally, the foregoing explanation assumes that downshifts follow essentially the opposite sequence of the corresponding up shifts and that several power on skip shifts, e.g., from first to third, are possible.

Referring now to FIG. 4, a diagrammatic representation of the relationship between the actual, physical gears and the virtual or blended gears of the nine speed automatic transmissions 10 and 10' is provided. As described above, second gear, fourth gear, sixth gear and eighth gear are virtual or blended gear ratios achieved by a utilizing various combinations of the gear ratios provided by the sub-transmission A and the sub-transmission B whereas first gear, third gear, fifth gear, seventh gear and ninth gear are actual physical or pure gear ratios provided individually by either the sub-transmission A or the sub-transmission B. In FIG. 4, the horizontal axis represents neutral and greater distances above the neutral axis represent larger forward numerical gear ratios whereas greater distances below the neutral axis represent larger reverse numerical gear ratios. The left vertical axis relates to pure gear ratios provided by the sub-transmission A and the right vertical axis relates to pure gear ratios provided by the sub-transmission B. Solid black circles represent physical or pure gear ratios, open or white circles represent virtual or blended gear ratios and cross-hatched circles represent reverse gear ratios. Note that there are no reverse virtual or blended gear ratios.

The oblique line joining first gear and third gear is exemplary and illustrative of the fact that second gear is a virtual gear which is a mixture or blend of the first gear ratio provided by the sub-transmission A and the third gear ratio provided by the sub-transmission B. The intersection of this oblique line with the center vertical line labeled A-B represents the blended second gear ratio achieved by the sub-transmissions A and B which is between the first gear ratio and the third gear ratio.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising:
an input member;
an output member;
a first, a second, a third and a fourth planetary gear assembly each having a first, a second and a third member;
a first and a second chain drive assembly each having a pair of sprockets and a sprocket engaging chain;
a first connecting member continuously connecting the first member of the first planetary gear assembly with a first of the pair of sprockets of the second chain drive assembly;
a second connecting member continuously connecting to the second member of the first planetary gear assembly;
a third connecting member continuously connecting the second member of the first planetary gear assembly with a first of the pair of sprockets of the first chain drive assembly;
a fourth connecting member continuously connecting to the second member of the second planetary gear assembly;
a fifth connecting member continuously connecting the third member of the second planetary gear assembly with the first member of the third planetary gear assembly;
a sixth connecting member continuously connecting a second of the pair of sprockets of the second chain drive assembly with the first member of the second planetary gear assembly;
a seventh connecting member continuously connecting a second of the pair of sprockets of the first chain drive assembly with the first member of the fourth planetary gear assembly;
an eighth connecting member continuously connecting the second member of the second planetary gear assembly with the second member of the third planetary gear assembly;
a first torque transmitting device selectively connecting the first member of the first planetary gear assembly with the input member;
a second torque transmitting device selectively connecting the second member of the first planetary gear assembly with the input member;
a third torque transmitting device selectively connecting the third member of the first planetary gear assembly to the input member;
a fourth torque transmitting device selectively connecting the third member of the first planetary gear assembly to a ground;
a fifth torque transmitting device selectively connecting the second member of the second planetary gear assembly with the ground;
a sixth torque transmitting device selectively connecting the first member of the third planetary gear assembly and the third member of the second planetary gear assembly with the ground;
a seventh torque transmitting device selectively connecting the first member of the second planetary gear assembly with the second member of the second planetary gear assembly;
an eighth torque transmitting device selectively connecting the third member of the fourth planetary gear assembly with the ground; and
a ninth torque transmitting device selectively connecting the third member of the fourth planetary gear assembly with the first member of the fourth planetary gear assembly, and
wherein the output member is continuously connected to the third member of the third planetary gear assembly and the second member of the fourth planetary gear assembly and the torque transmitting devices are engageable in combinations of at least two to establish at least nine forward gear ratios and one reverse gear ratio.

2. The multiple speed automatic transmission of claim 1 wherein the first members of the planetary gear assemblies are sun gear members, the second members of the planetary gear assemblies are planet carrier members, and the third members of the planetary gear assemblies are ring gear members.

3. The multiple speed automatic transmission of claim 2 wherein the input member and the output member are shafts which define parallel, spaced-apart axes.

4. The multiple speed automatic transmission of claim 3 wherein the first, second, and third torque transmitting devices are friction clutches, the fourth, fifth, sixth, and eighth torque transmitting devices are brakes, and the seventh and ninth torque transmitting devices are synchronizer clutches.

* * * * *